United States Patent
Wirtz et al.

[11] 3,976,327
[45] Aug. 24, 1976

[54] ADJUSTING ARRANGEMENT

[75] Inventors: Egon Wirtz, Remscheid; Karl Heinz Ligensa, Dabringhausen, both of Germany

[73] Assignee: Keiper KG, Remscheid-Hasten, Germany

[22] Filed: Jan. 28, 1975

[21] Appl. No.: 544,780

[30] Foreign Application Priority Data
Feb. 1, 1974 Germany............................ 2404815

[52] U.S. Cl............................. 297/366; 296/65 R
[51] Int. Cl.²........................................ B60N 1/06
[58] Field of Search................. 296/65 R, 65 A; 297/366, 362; 16/145, 146

[56] References Cited
UNITED STATES PATENTS

| | | | |
|---|---|---|---|
| 3,099,485 | 7/1963 | Beierbach et al. | 16/146 X |
| 3,333,892 | 8/1967 | Weiner et al. | 297/362 X |
| 3,371,374 | 3/1968 | Marchione | 16/145 |

FOREIGN PATENTS OR APPLICATIONS

| | | | |
|---|---|---|---|
| 1,419,518 | 10/1965 | France | 297/366 |

*Primary Examiner*—L. J. Paperner
*Assistant Examiner*—Donald W. Underwood
*Attorney, Agent, or Firm*—Michael J. Striker

[57] ABSTRACT

Two strap members are respectively connectable with a seat member and a backrest member and are joined for relative pivoting movement. An inner and a cooperating outer gear annulus are provided on the respective strap members in engagement with one another. A brake sleeve is provided on one of the strap members and a helical spring is located within the brake sleeve and normally frictionally engages an inner surface thereof. The spring has two inwardly angled end portions. An output member is turnably mounted within the sleeve and has a first section extending between the end portions of the spring, and a turnable control member is adjacent the output member and has a second section also extending between the end portions. A torsion spring engages the input and control members and urges the sections thereof into engagement with the respective end portions of the helical spring.

5 Claims, 3 Drawing Figures

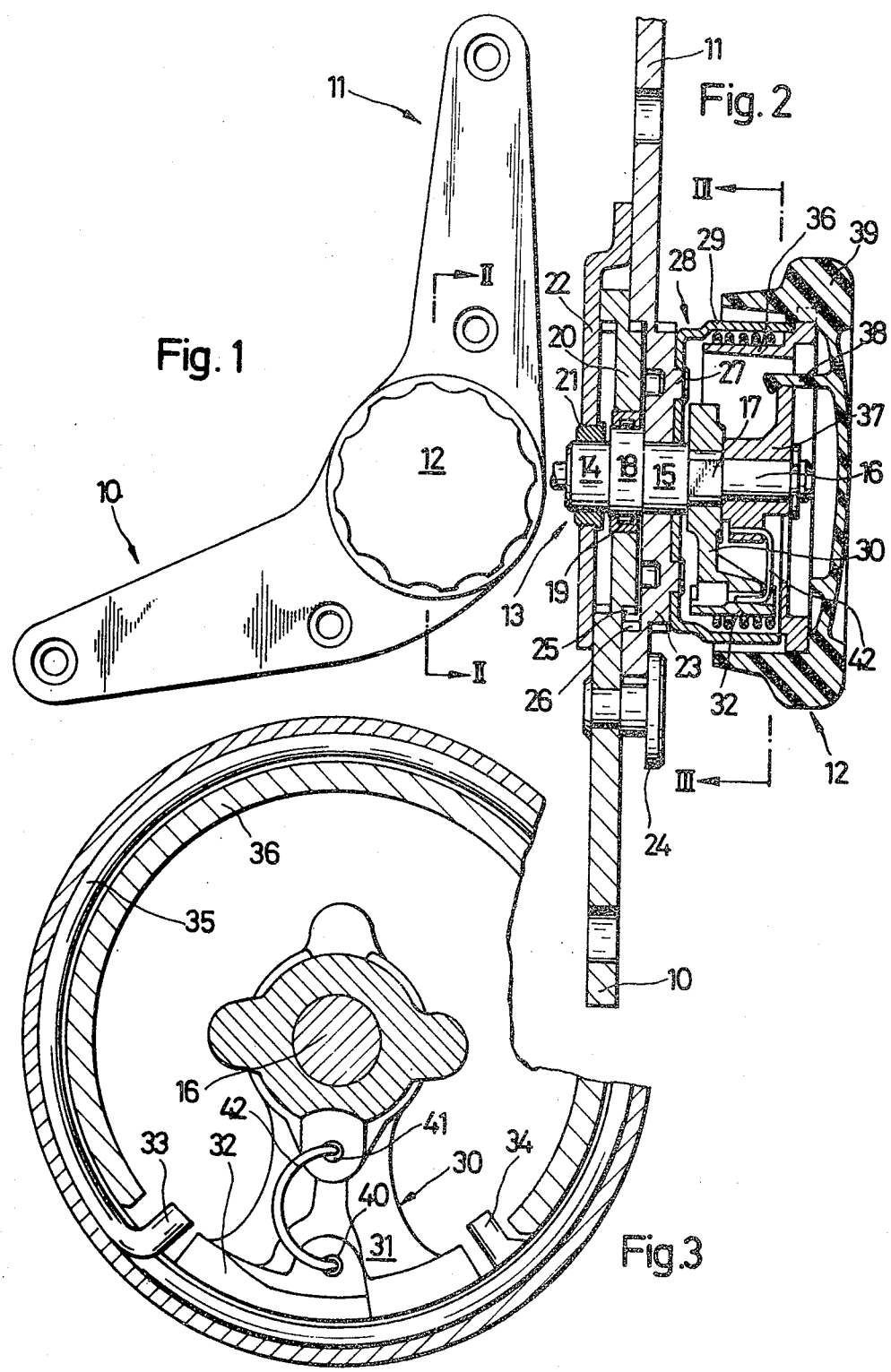

ADJUSTING ARRANGEMENT

BACKGROUND OF THE INVENTION

The present invention relates generally to a seat construction, and more particularly to a construction which is especially suitable for vehicle seats and the like. In its broadest aspect, the invention relates to adjusting arrangements.

Many seats, especially those in automotive and other vehicles, are now being constructed so that the back can be raised or lowered to the preference of a user. Such seats are provided with arrangements which permit the back to be pivoted relative to the actual seat member and to be arrested in a selected position. These arrangements have a handle, in form of a turnable knob or the like, which turns to release and to reengage the arrangement, and they usually have a brake sleeve in which there is located a helical spring that engages the inner surface of the sleeve in frictional relationship and has opposite ends engaging an input member that is turnable by means of the knob, and an output member, both of these members being turnably mounted coaxially with reference to the sleeve. The purpose of the spring is to prevent undesired relative displacement of the seat member and the backrest member, which may occur — especially in the case of automotive vehicles — as a result of vibrations, shocks and the like, even though the cooperating gears of the arrangement may be of the self-locking type.

The spring in these prior-art arrangements cooperates with portions of the input and output member. Since the end portions of the spring are not in constant contact with these portions of the input and output members, the prior-art arrangements must undergo an idling movement, that is they must traverse a certain distance when the arrangement is actuated by turning the knob, before the output member is engaged and taken along by the input member (which is being turned by the knob) to effect relative displacement between the backrest member and the seat member of the seat. The play which causes this idling movement is to some extent determined by the fact that it must be possible to stress the helical spring in a sense reducing its diameter so as to decrease the braking effect which it has, for the duration of the displacement of the backrest member relative to the seat member. However, the play is determined to a much larger extent by manufacturing tolerances which must be relatively liberal in order to permit economic manufacturing conditions. If these manufacturing tolerances were to be tightened, the degree of precision required during the manufacture would be so high as to make the parts in question too costly.

On the other hand, this idling movement described above is often found bothersome by a user, particularly if because of it the user must change his grip on the handle one or more times in order to obtain the desired adjustment in the position of the backrest member relative to that of the seat member. This is especially true when the handle is configured as a turnable knob.

SUMMARY OF THE INVENTION

Accordingly, it is an object of the present invention to overcome the disadvantages of the prior art.

More particularly, it is an object of the present invention to provide an improved adjusting arrangement, which is suitable with particular advantage for use in adjustable seats, such as vehicle seats, and which avoids the aforementioned disadvantages.

It should be understood that the invention is applicable not only to seats, but also to other adjusting arrangements where two elements must be releasable for relative movement, and must be re-engageable in a different relative position, and the invention is intended to include all such possibilities.

In keeping with these objects, and with others which will become apparent hereafter, one feature of the invention resides in an adjusting arrangement, particularly for a vehicle seat, which comprises two strap members respectively connectable with a first member and a second member and being joined for relative movement. An inner and a cooperating outer gear annulus is provided on the respective strap members. A brake sleeve is on one of the strap members. A helical spring is located within the brake sleeve and normally frictionally engages an inner surface thereof; this spring has two inwardly angled end portions. An output member is turnably mounted within the sleeve and has a first section extending between the end portions, and a turnable control member is adjacent the output member and has a second section also extending between the end portions. A torsion spring engages the input and control member and urges the sections into engagement with the respective end portions of the helical spring.

This construction eliminates the idling movement which is found objectionable in the prior art, but makes it unnecessary to tighten the manufacturing tolerances of the parts. All that is left of the previous idling movement is the very small angular movement that is necessary in order to tension the helical spring sufficiently to reduce its tight frictional engagement with the inner surface of the sleeve.

In the case of arrangements which are used for adjusting movements in mutually opposite directions, for example on vehicle seats, it is advisable according to a further embodiment of the invention to locate the point of engagement of the torsion spring between the angled ends and the input member or the control member on a common line which extends transversely of the axis of rotation. In such a case the arrangement becomes effective for one or the other direction of adjustment, depending upon the direction in which the control member is turned, but of course when direction is reversed the idling movement will be double the normal amount due to this reversal. However, this is insignificant in any case, and furthermore once the direction reversal has been completed, further adjustments in the same direction will have only the usual small idling movement.

The torsion spring may be constructed in various different ways, and also arranged in different manner. A currently preferred embodiment proposes the use of a substantially U-shaped spring whose legs engage in holes formed in the input and control members. Of course, this type of spring will exert pressure, but it should be understood that other springs could be used which will exert tension. These would have to straddle the axis of rotation and their opposite ends would have to be located at opposite sides of the axis of rotation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view showing the invention embodied in an arrangement for use in a motor vehicle seat;

FIG. 2 is an enlarged-scale section on line II—II of FIG. 1; and

FIG. 3 is a simplified fragmentary enlarged-scale section taken on line III—III of FIG. 2.

DESCRIPTION OF THE PREFERRED EMBODIMENTS:

The invention has been illustrated in FIGS. 1–3 as embodied in a vehicle seat, for example of an automotive vehicle. It is reiterated, however, that it is also suitable for other applications wherein two members analogous to the backrest member and seat member of a vehicle seat, must be adjusted with reference to one another.

FIG. 1 shows a strap member 10 which is connected to the seat member of a vehicle seat and a strap member 11 which is connected to the backrest member of the vehicle seat; the members 10 and 11 are connected with one another so as to be pivotable relative to one another. An adjusting arrangement according to FIGS. 2 and 3 is used to permit relative pivoting movement of the members 10 and 11 in a continuously adjustable manner. The operation of the adjusting arrangement is initiated by turning of a knob 12. It is preferred that both sides of the vehicle seat are each provided with a pair of strap members 10 and 11, but only a single knob 12 may be provided on one side, and its movements can be transmitted to the arrangement at the other side by means of a shaft or other arrangement.

In the illustrated embodiment a shaft 13 is provided having sections 14, 15 and 16 which are coaxial. A non-round section 17 is also provided on the shaft, intermediate the sections 15 and 16; on it, an output member 30 is mounted for rotation with the shaft. An eccentrically arranged shaft section 18 is provided intermediate the sections 14 and 15 and is turnably journalled by means of a bearing 19 in a stamped or otherwise formed projecting portion 20 of the member 10. The sections 14 and 15 are turnably mounted in the member 11. The section 14 extends into a journalling sleeve 21 of an arm 22 which is connected with the member 11, and the section 15 is journalled in a bore of a stamped projecting portion 23 of the member 11. The head of the member 11 is prevented from lifting-off relative to the member 10 by the head of a rivet or a pin 24 which overlaps it and which is rivetted onto the member 10. The portion 20 which projects in FIG. 2 to the right-hand side past the member 10 is surrounded by an external annulus of teeth 25. The space formed by the projection 23 of the member 11 is bounded by an internal annulus 26 of teeth. The annulus 26 has a number of teeth which is greater than the number of teeth of the annulus 25. The arrangements and dimensions are such that in accordance with the eccentricity of the shaft section 18 relative to the shaft sections 14 and 15 the annulus 26 will perform a tumbling rolling movement on the annulus 25, when the shaft 13 is turned.

A brake sleeve 28 is fixedly mounted on the portion 23 of the member 11, by means of pins 27; its inner circumferential surface 29 serves as a braking surface. On the portion 17 of the shaft 13 which extends into the sleeve 28 there is mounted an output member 30 which can turn only with the shaft 13 and which extends with a portion 32 of a radially projecting arm 31 between the inwardly angled ends 33, 34 of a helical spring 35 which frictionally engages the inner circumferential surface 29. A certain amount of play is left between the portion 32 and those surfaces of the angled spring ends 23, 34 which face it. A portion 36 of an input member 37 which is freely turnably mounted on the shaft section 16, also extends into the interior of the sleeve 28. A handle 39 is coupled with the input member 37 via elastically deformable pins 38. A further amount of play is left between the spring ends 33, 34 and the respectively juxtaposed edges of the curved portion 36.

Angled pins or end portions of a substantially U-shaped torsion spring 42 extend into respective axially parallel bores 40 and 41 of the portion 32 and the member 37; when the spring 42 is installed it is prestressed so that it will exert an outward pressure. When the play between the portions 32, 36 and the spring end 33, 34 is evenly distributed, the bores 40 and 41 are located in a plane which extends radially with reference to the axis of rotation, as is evident from FIG. 3. This defines a dead center direction for the spring 42. When the portions 32 and 36 are turned with reference to one another, the spring 42 exerts a torque which — depending upon the direction of rotation — will hold the spring ends 33, 34 without play between the associated edges of the members 32, 36.

From the foregoing description it will be understood that element 11 is formed with an internal annulus of gear teeth 26 which surrounds a smaller-diameter external annulus of gear teeth 25 provided on the element 10. Because of the eccentricity of the portion 18 of the shaft 13 which turnably extends into the element 10, relative to the shaft portions 14 and 15 which extend into element 11, the annulus 25 is located eccentrically within the annulus 26. The degree of eccentricity is such that the teeth of annulus 25 mesh with the teeth of annulus 26 at one portion of the circumference of the respective annuli 25 and 26. This prevents relative movements of the elements 10 and 11; however, the relative angular position of the elements 10 and 11 can be changed by turning of the shaft 13 which results in a circumferential displacement of the point of engagement of the teeth of annulus 25 with the teeth of annulus 26. Because of the difference in the number of teeth of the annuli 25 and 26, this displacement results in a change of the relative angular position of elements 10 and 11.

The shaft 13 does not require any fixed (i.e. non-rotatable) connection with either the element 10 or the element 11, because the teeth of the annuli 25 and 26 are always in engagement with one another at some part of the circumference of these annuli and thus maintain the elements 10 and 11 in their selected relative angular positions unless the shaft 13 is turned in order to deliberately change this angular position. It will of course be understood that once the handle releases the spring 35, the seat back is adjusted manually to the desired position.

In the respectively selected relative angular position the member 10 is supported by the engagement of a certain number of teeth of the annulus 25 with a certain number of teeth of the annulus 26. Independently of whether the arrangement is self-locking or not, undesired movements are avoided in that the shaft 13 is supported, via the member 30 and the portion 32 thereof, between the spring ends 33, 34 of the spring 35 which frictionally engages the inner surface 29. To vary the relative angular position of the members 10 and 11, that is in this embodiment to incline the backrest member of the seat to a greater or lesser degree with reference to the seat member, the handle 12 is turned. The cap 39 thereof takes along the member 37 via the pins 38, and the portion 36 of the member 37 moves against the spring end 33 or 34, depending upon the direction of rotation. During the further movement this particular spring end is then taken along in a sense causing a tightening of the spring 35, decreasing the radial tension with which it engages the surface 29, so that the spring 35 can now follow the direction of rotation of the handle 12. The engaged spring end 33 or 34 contacts, after an idling movement corresponding to the amount of play, the one or the other side edge of the portion 32 which takes along the member 29 and via the same the shaft 13, so that the annuli of gear teeth 25, 26 can now turn in engagement with one another.

In parallel with a reduction of the play between their portions 32, 36 and the respectively effective spring ends 33 or 34, the effective line of force exerted by the spring 42 leaves the dead-center direction shown in FIG. 3, so that it will now exert upon the supporting elements, namely the members 30 and 37, torques which act in mutually opposite directions, so that the portion 32 and 36 are maintained in engagement with the respectively effective spring end 33, 34 even when the handle 12 is temporarily released to permit the user to change his hand grip on it. This means that a minimum idling movement of the handle 12 is required when the user changes his hand grip. When the direction of rotation of the handle 12 is reversed, the handle must perform an idling movement corresponding to the total amount of play, and the spring 42 moves from one end position through the dead-center direction indicated in FIG. 3 into the other end position and then cooperates with the now active spring end 33 or 34 to maintain the portions 32 and 36 in engagement with this spring end.

The invention is by no means limited to the embodiment illustrated. Evidently, those skilled in the art will find various ways of modifying it, and these ways are intended to be included in the concept of the invention. For example, as previously pointed out, the invention can also be used not on vehicle seats, but for window lifts of vehicles where there is also a possibility that an undesired movement of the lift (and thus lowering of the window) might occur due to vibrations of the vehicle. The spring 42 could be replaced with a different spring or spring arrangement, for example a tension-exerting spring, in which case in FIG. 1 the connection 41 would have to be located not on that side of the axis of rotation which is determined by the connection 40, but on the other side thereof.

It will be understood that each of the elements described above, or two or more together, may also find a useful application in other types of constructions, differing from the types described above.

While the invention has been illustrated and described as embodied in an adjusting arrangement which is especially but not exclusively suitable for vehicle seats, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention.

What is claimed as new and desired to be protected by Letters Patent is set forth in the appended claims.

1. In an adjusting arrangement, particularly for a vehicle seat, a combination comprising two strap members respectively connectable with a first element and a second element and being joined for relative movement; an inner and a cooperating outer gear annulus on the respective trap members; a brake sleeve on and movable with one of said strap members; a helical spring concentrically located within said brake sleeve and normally frictionally engaging an inner surface thereof, said spring having two circumferentially spaced inwardly angled end portions; an output member turnably mounted within said helical spring and having a first section extending between said end portions, and a turnable control member coaxially adjacent said output member and having a second section also extending between said end portions and selectively engageable with the respective end portions in a sense causing the diameter of said helical spring to become reduced; and a coupling spring engaging said output and control members and urging each of said sections into engagement with one of said end portions of said helical spring.

2. A combination as defined in claim 1, said control member being turnable about an axis coaxial with said sleeve; and wherein said coupling spring engages said output and control member at respective positions which are located on a line intersecting said axis.

3. A combination as defined in claim 1, wherein said coupling spring is of substantially U-shaped outline.

4. A combination as defined in claim 3, wherein said coupling spring has legs provided with free end portions; said output and control members having respective holes in which said free end portions are received.

5. A combination as defined in claim 4, wherein said end portions of said coupling spring are angled with reference to the respective legs.

* * * * *